US010001786B2

(12) United States Patent
Hutchins et al.

(10) Patent No.: US 10,001,786 B2
(45) Date of Patent: Jun. 19, 2018

(54) SOLENOID MANIFOLD DEVICE, CONTROLLER AND METHOD OF CONTROLLING A SOLENOID MANIFOLD (71) Applicant: Bendix Commercial Vehicle Systems LLC, Elyria, OH (US)

(72) Inventors: Christopher H Hutchins, Bay Village, OH (US); Daniel P Zula, North Ridgeville, OH (US); Randy S Wise, Elyria, OH (US); Timothy J Frashure, Columbia Station, OH (US); Thomas S Legeza, Olmsted Township, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days. days.

(21) Appl. No.: 15/076,760

(22) Filed: Mar. 22, 2016

(65) Prior Publication Data

US 2017/0277204 A1 Sep. 28, 2017

(51) Int. Cl.
*G05D 7/06* (2006.01)
*B60R 16/08* (2006.01)
*F15B 13/08* (2006.01)

(52) U.S. Cl.
CPC .......... *G05D 7/0629* (2013.01); *B60R 16/08* (2013.01); *F15B 13/08* (2013.01); *F15B 13/085* (2013.01);
(Continued)

(58) Field of Classification Search
CPC ... G05D 7/0629; F15B 13/08; F15B 13/0867; F15B 13/0857; F15B 13/085; B60R 16/08
See application file for complete search history.

(56) References Cited

U.S. PATENT DOCUMENTS 3,976,098 A * 8/1976 Raymond ........... F15B 13/0807
137/271
4,524,807 A 6/1985 Toliusis
(Continued)

FOREIGN PATENT DOCUMENTS

CH         683021 A5    12/1993
EP         2110560 A2   10/2009

OTHER PUBLICATIONS

Bendix Commercial Vehicle Systems LLC "Bendix SMS-9700 Accessory Solenoid Manifold," Service Data Sheet SD-03-10432, 4 pages, Bendix Commercial Vehicle Systems LLC Elyria Ohio USA.
(Continued)

*Primary Examiner* — Rodney A Butler
(74) *Attorney, Agent, or Firm* — Cheryl L. Greenly; Brian E. Kondas; Eugene E. Clair (57) ABSTRACT

Various embodiments of a controller for controlling at least one solenoid comprise a first electrical connector for electrically communicating with a vehicle communications bus; a second electrical connector for transmitting messages to a plurality of solenoids; and a processor having control logic. The control logic is capable of associating each of a plurality of solenoids with a vehicle function when the plurality of solenoids are in electrical communication with the controller; receiving a control message at the first electrical connector in a first format to enable a first vehicle function; and electrically communicating a control message in a second format at the second electrical connector in response to receiving the control message in the first format to control one of the plurality of solenoids associated with the first vehicle function.

5 Claims, 5 Drawing Sheets

(52) U.S. Cl.
CPC ...... *F15B 13/0857* (2013.01); *F15B 13/0867* (2013.01)

(56) References Cited

U.S. PATENT DOCUMENTS

| | | | |
|---|---|---|---|
| 4,815,496 A | 3/1989 | Nishitani | |
| 4,854,346 A | 8/1989 | Nakanishi | |
| 5,115,698 A * | 5/1992 | Leising | F16H 61/0206 475/116 |
| 5,211,080 A * | 5/1993 | Leising | F16H 61/0206 475/120 |
| 6,382,257 B2 | 5/2002 | Mead | |
| 6,840,273 B2 | 1/2005 | Miyazoe | |
| 7,467,640 B2 | 12/2008 | Bordonaro | |
| 8,746,272 B2 | 6/2014 | Smith | |
| 2001/0003289 A1 | 6/2001 | Mead | |
| 2004/0221713 A1 | 11/2004 | Mundry | |
| 2007/0133143 A1 * | 6/2007 | Laurent | F16H 61/0006 361/160 |
| 2012/0097282 A1 | 4/2012 | Coombs | |
| 2012/0104294 A1 | 5/2012 | Heusser | |
| 2014/0107887 A1 * | 4/2014 | Bissontz | G01R 31/006 701/34.4 |
| 2015/0134216 A1 * | 5/2015 | Zula | G01R 31/06 701/70 |

OTHER PUBLICATIONS

Bendix Commercial Vehicle Systems LLC "Bendix FCS-9700 Fan Clutch Solenoid," Service Data Sheet SD-03-10433, 2 pages, Bendix Commercial Vehicle Systems LLC Elyria Ohio USA.

Terry Costlow "Pumping up hydraulic capabilities," Off-Highway Engineering magazine, Dec. 2015, 3 pages, SAE International, Warrendale Pennsylvania, USA.

European Patent Office, "Partial European search report," dated Sep. 5, 2017, 10 pages, Munich Germany.

* cited by examiner

SOLENOID MANIFOLD DEVICE, CONTROLLER AND METHOD OF CONTROLLING A SOLENOID MANIFOLD

BACKGROUND

The present invention relates to embodiments of a solenoid manifold device and method for controlling a solenoid manifold. A commercial vehicle equipped with pneumatic control systems may have several solenoids located throughout the vehicle to control air operated accessory devices, such as a horn, a fan clutch, and a fifth wheel lock. Some manufacturers offer solenoid manifolds, which cluster groups of solenoids for air operated accessory devices in efficient locations on the vehicle. Solenoids in these manifolds are still individually controlled by switches or different controllers on the vehicle. Due to the commonality of connectors on the solenoids in the solenoid manifold, there is a chance that there may be incorrect connections, which may cause the wrong solenoid to be activated. In addition, each solenoid manifold receives a new part number based on the number of solenoids in the manifold and which air operated accessory functions are controlled, causing extensive part number management for the manufacturer. Therefore, there is a need for an improved solenoid manifold assembly.

SUMMARY

Various examples of a controller for controlling at least one solenoid of a solenoid manifold comprise a first electrical connector for electrically communicating with a vehicle communications bus; a second electrical connector for transmitting messages to a plurality of solenoids; and a processor having control logic. The control logic is capable of associating each of a plurality of solenoids with a vehicle function when the plurality of solenoids are in electrical communication with the controller; receiving a control message to enable a first vehicle function at the first electrical connector in a first format; and electrically communicating a control message in a second format at the second electrical connector in response to receiving the control message in the first format to control one of the plurality of solenoids associated with the first vehicle function.

Various examples of a solenoid control device comprise a first connector portion for mating to a first solenoid, the first connector portion comprising a power line, a communications line and a ground line. The solenoid control device comprises a jumper portion for coupling the first connector portion to a second connector portion; the jumper communicating with the power line, the ground line and the communications line and comprising a processor. The solenoid control device comprises a second connector portion for mating to a second solenoid, the second connector portion comprising a first end and a second end, the first end capable of receiving a second solenoid control device and communicating with the power line, the communications line and the ground line and the second end comprising a second control signal output and the ground line.

In accordance with another aspect, a method of controlling a plurality of solenoids comprises associating each solenoid of a plurality of solenoids with a single one of a plurality of vehicle functions in the controller; receiving a first message at the controller, the message including a request to enable one of the plurality of vehicle functions; and transmitting a second message from the controller to the plurality of solenoids to control the solenoid associated with the one of the plurality of vehicle functions.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
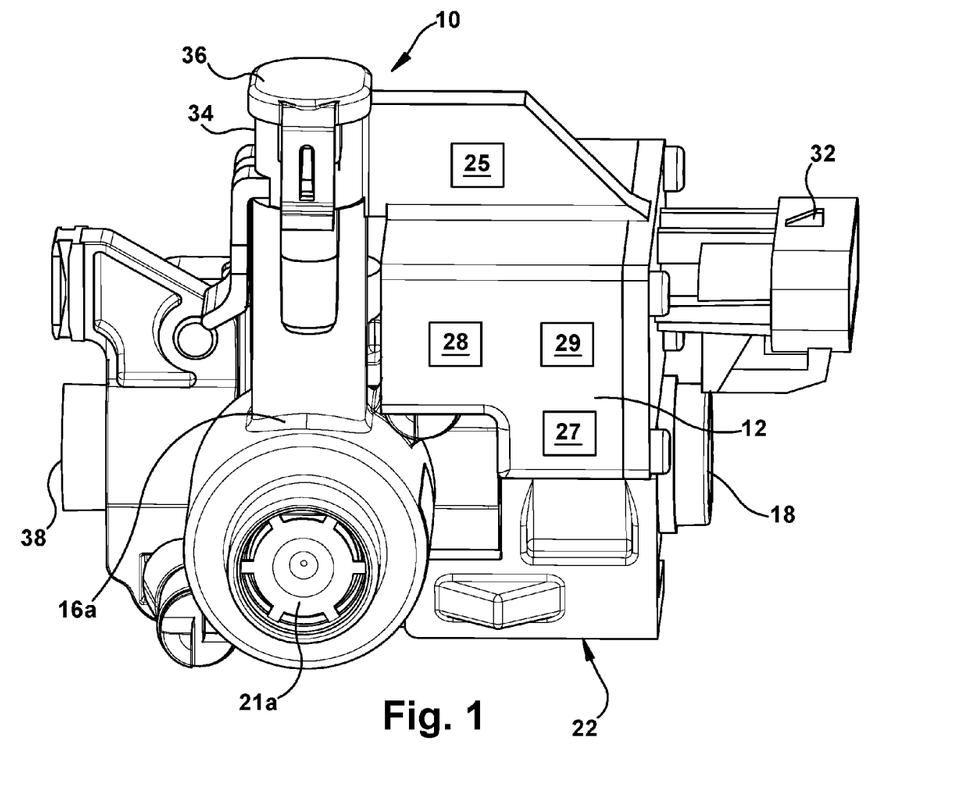
FIG. 1 illustrates a solenoid manifold with a single solenoid according to an example of this invention.

FIG. 1 illustrates a solenoid manifold 10 having a single solenoid, according to one example of the invention. The solenoid manifold 10 includes a pneumatic portion 22. The pneumatic portion 22 includes a supply port 18 for receiving supply air and a delivery port (not shown) for delivering air. The pneumatic portion 22 includes an exhaust port 21a for exhausting air. Since the solenoid manifold 10 is pneumatically connected only to a first solenoid 16a, the solenoid manifold 10 includes an end cap 38 to seal the pneumatic portion 22.

The solenoid manifold 10 includes a controller 12. The controller 12 includes a first electrical connector 32. The first electrical connector 32 connects the controller 12 to a vehicle power source, vehicle ground and a first communications bus. The controller 12 has a second electrical connector 34, which electrically connects a first solenoid 16a to the controller 12. The second electrical connector 34 includes a power line, a ground line and a second communications line. The second communications line communicates with a second vehicle communications bus. An electrical cover 36 may be used on the second electrical connector 34 when only the first solenoid 16a is connected to the controller 12. In one example, the first solenoid 16a and the controller 12 may be integrated.

The power received at the first electrical connector 32 may be received directly from a vehicle battery or received only when the vehicle ignition is on. In an example where power is received directly from the vehicle battery, the controller 12 may manage its own power state via a wake-up function received on the first communications bus or may use another power-on-demand management scheme. The power received from the vehicle battery may be subject to noise, as the battery also supplies many other high current components on the vehicle. Therefore, controller 12 includes a power conditioning circuit 29 to condition the vehicle battery power to eliminate noise and power spikes while providing a protected twelve volt source of power to the second electrical connector 34. In addition, the power conditioning circuit 29 may transform a twenty-four volt source of battery power to a twelve volt source. Alternatively, the power conditioning circuit 29 of the controller 12 may condition a twenty-four volt source, and the components connected to the solenoid manifold 10 may provide local regulation of the voltage down to another voltage, such as twelve volts. Therefore, the controller 12 would be the same whether the vehicle has a twelve volt battery or a twenty four volt battery.

The controller 12 includes a driver circuit 25 for controlling the first solenoid 16a. The driver circuit 25 may include a Field Effect Transistor (FET) or other means for activating a high current device in response to a control signal.

Controller 12 includes a processor having control logic 28 for associating the solenoid 16a with a vehicle function, receiving and transmitting messages via the first connector 32 in a first format and receiving and transmitting messages via the second connector 34 in a second format. The control logic 28 may include a memory, which may be a volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 28.

The first communications bus connected to the first connector 32 may use the SAEJ1939 protocol or other vehicle communications protocol, including wireless protocols, such as IEEE 802.11. The second communications bus connected to the second connector 34 may use the LIN (Local Interconnect Network) protocol or a proprietary protocol. The control logic 28 transforms the messages received in the protocol at the first connector 32 into the protocol transmitted at the second connector 34. The control logic 28 may also receive messages at the second connector 34 in the second protocol and transmit messages at the first connector 32 using the first protocol.

In another example, the controller 12 may also include a pressure sensor 27. The pressure sensor 27 measures the supply pressure received at the supply port 18. The controller 12 may also include provisions to monitor the voltage and current received at the first connector 32 and monitor the voltage and current delivered to the second electrical connector 34.

The first solenoid 16a may be of a normally closed or a normally open type, similar to a solenoid used in the Bendix® SMS-9700™ accessory solenoid manifold. The first solenoid 16a is pneumatically connected to the pneumatic portion 22 of the solenoid manifold 10. The first solenoid 16a receives supply air from supply port 18 and communicates with the delivery port (not shown) and the exhaust port 21a.

The controller 12 of solenoid manifold 10 is capable of activating a single solenoid for one pneumatic feature on a vehicle by turning on and off the integrated driver circuit 25. The feature may be one of a plurality of air controlled accessory features on a vehicle, such as an air suspension control, an interaxle lock control, a differential lock control or a power take off control. An operator of the vehicle initiates a request for the vehicle feature by turning on a switch or programming the request into a dash mounted interface. The switch or interface is connected to the vehicle communications bus. The switch or interface transmits the request for the vehicle feature to be enabled as a control message in the format of the protocol for the vehicle communications bus. However, it is understood that any device on the communication bus may be permitted to initiate a request for the vehicle feature controlled by the solenoid manifold 10. The feature request may be generated autonomously within the boundary of the vehicle or remotely via a telematics connection. The controller 12 of solenoid manifold 10 receives the control message on the vehicle communications bus via the first electrical connector 32, transforms the message into the format accepted by the second vehicle communications bus and transmits the message at the second electrical connector 34. The first solenoid 16a responds to the control message by either opening a passageway to deliver air to delivery port 20a or closing a passageway to discontinue the delivery of air to delivery port 20a and exhausting any air in the passageway to atmosphere through the exhaust port 21a.

The functions of controller 12 may be integrated with another vehicle controller, such as an electronic air management system.

Figure 2A:
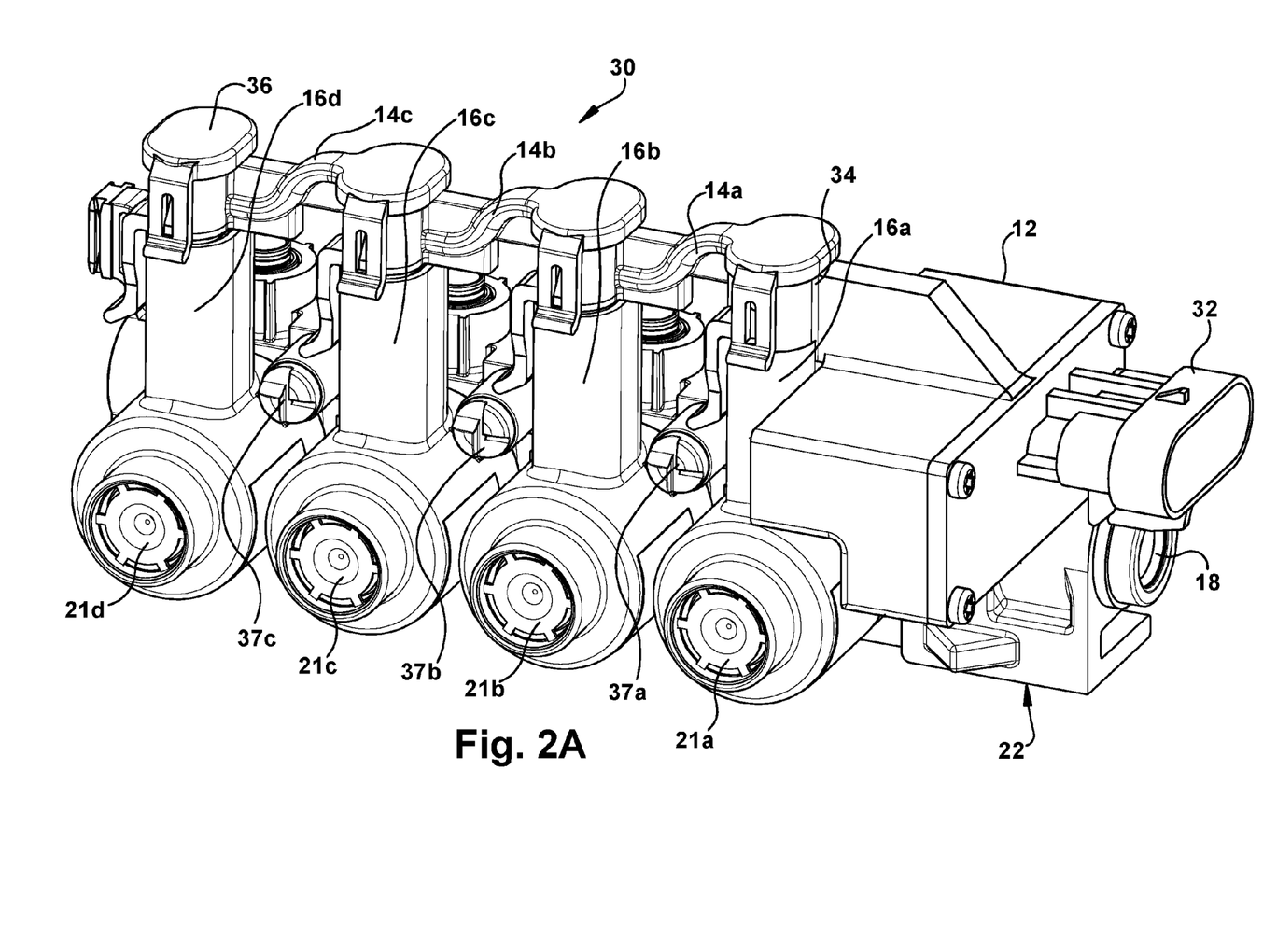
FIG. 2A illustrates a side perspective view of a solenoid manifold with multiple solenoids, according to an example of this invention.
Figure 2B:
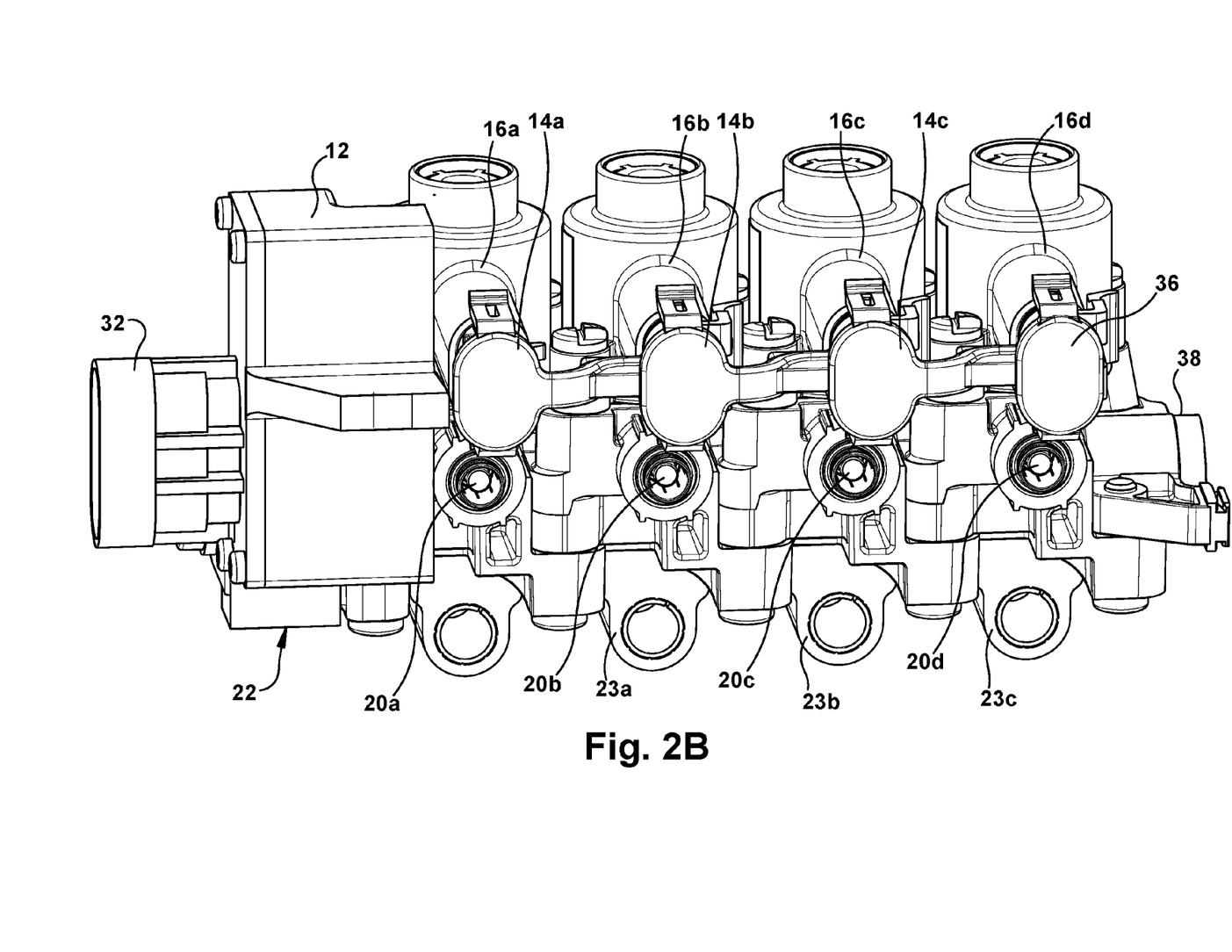
FIG. 2B illustrates a top perspective view of the solenoid manifold of FIG. 2A.

Referring to both FIG. 2A and FIG. 2B, the figures illustrate a solenoid manifold 30 having a plurality of solenoids, according to another example of the invention. The solenoid manifold 30 includes the pneumatic portion 22, having the supply port 18. The solenoid manifold 30 includes the controller 12, as described above, since the controller 12 can be programmed to control a single solenoid or a plurality of solenoids. The controller 12 is electrically connected to the first solenoid 16a. The first solenoid 16a is pneumatically connected to the pneumatic portion 22 of the solenoid manifold 10. The first solenoid 16a is pneumatically connected to the supply port 18, the delivery port 20a (as shown in FIG. 2B) and the exhaust port 21a.

In order to connect a plurality of solenoids to the solenoid manifold 30, the solenoid manifold 30 includes a first solenoid control device 14a. The solenoid control device 14a electrically connects the first solenoid 16a and controller 12 to a second solenoid 16b. A second solenoid control device 14b electrically connects the first solenoid 16a, the second solenoid 16b and controller 12 to a third solenoid 16c. A third solenoid control device 14c electrically connects the first solenoid 16a, the second solenoid 16b, the third solenoid 16c and controller 12 to a fourth solenoid 16d. It is understood that there may be only two solenoids or more than four solenoids making up the array of solenoids as part of solenoid manifold 30.

The solenoids 16a, 16b, 16c, 16d are pneumatically connected to the pneumatic portion 22 through individual pneumatic portions 23a, 23b, 23c (as shown in FIG. 2B). The pneumatic portions 23a, 23b, 23c may be connected by push-to-connect fittings, threaded fittings or other means. The pneumatic portion 22 includes the supply port 18 and supply air is communicated through pneumatic portion 22 to each of the pneumatic portions 23a, 23b, 23c. Each solenoid 16a, 16b, 16c, 16d includes a dedicated delivery port 20a, 20b, 20c, 20d and dedicated exhaust port 21a, 21b, 21c, 21d. The solenoids 16a, 16b, 16c, 16d may also be fastened together mechanically using fasteners 37a, 37b, 37c. Since there are only four solenoids, the solenoid manifold 30 includes the end cap 38 to seal the end of pneumatic portion 23c. The mechanical and pneumatic portions of the solenoids 16b, 16c, 16d may be similar to that of the SMS-9700™ accessory solenoid manifold, available from Bendix Commercial Vehicle Systems LLC, Elyria Ohio.

The solenoid manifold 30 having the first solenoid 16a, second solenoid 16b, third solenoid 16c and fourth solenoid 16d is capable of controlling up to four different pneumatic accessory features on the vehicle. The plurality of features may include air suspension control, interaxle lock control, differential lock control, power take off control, lift axle control, trailer dump gate control, fifth wheel slide lock control or any other pneumatically controlled accessory feature on a vehicle. An operator of the vehicle initiates a request for any one of or all of the vehicle features by turning switches or programming the request into a dash mounted interface. The switch or interface is connected to the vehicle communications bus and transmits the request as a control message in the format of the protocol for the vehicle communications bus. The controller 12 receives the control message on the first vehicle communications bus at the first electrical connector 32, transforms the message into the format accepted by the second vehicle communications bus, including a unique identifier for the solenoid associated with the vehicle function, and transmits the control message at the second electrical connector 34.

Each of the solenoids 16a, 16b, 16c, 16d controls a different function on the vehicle. Therefore, the first solenoid 16a may be a normally closed solenoid that only supplies air through delivery port 20a in response to actuation of the first solenoid 16a while second solenoid 16b may be a normally open solenoid that supplies air through delivery port 20b until the second solenoid 16b is activated. Each of the functions of the solenoids 16a, 16b, 16c, 16d is identified by the vehicle manufacturer. Each of the solenoids 16a, 16b, 16c, 16d can be programmed to control different functions throughout the operation of the solenoid manifold 30.

By having a single controller 12 control multiple solenoids 16a, 16b, 16c, 16d, the vehicle communications bus has fewer controllers on the bus, which improves bus reliability and speed for all controllers on the bus due to less bus traffic. Additionally, by distributing the solenoid drivers across modular segments defined by the solenoid control devices 14a, 14b, 14c, the solenoid manifold 30 may be increased in scale with each additional solenoid. This feature prevents adding multiple individual controllers for vehicles that only need a few solenoids.

Therefore, a controller for controlling at least one solenoid of a solenoid manifold comprise a first electrical connector for electrically communicating with a vehicle communications bus; a second electrical connector for transmitting messages to a plurality of solenoids; and a processor having control logic. The control logic is capable of associating each of a plurality of solenoids with a vehicle function when the plurality of solenoids are in electrical communication with the controller; receiving a control message to enable a first vehicle function at the first electrical connector in a first format; and electrically communicating a control message in a second format at the second electrical connector in response to receiving the control message in the first format to control one of the plurality of solenoids associated with the first vehicle function.

Figure 3:
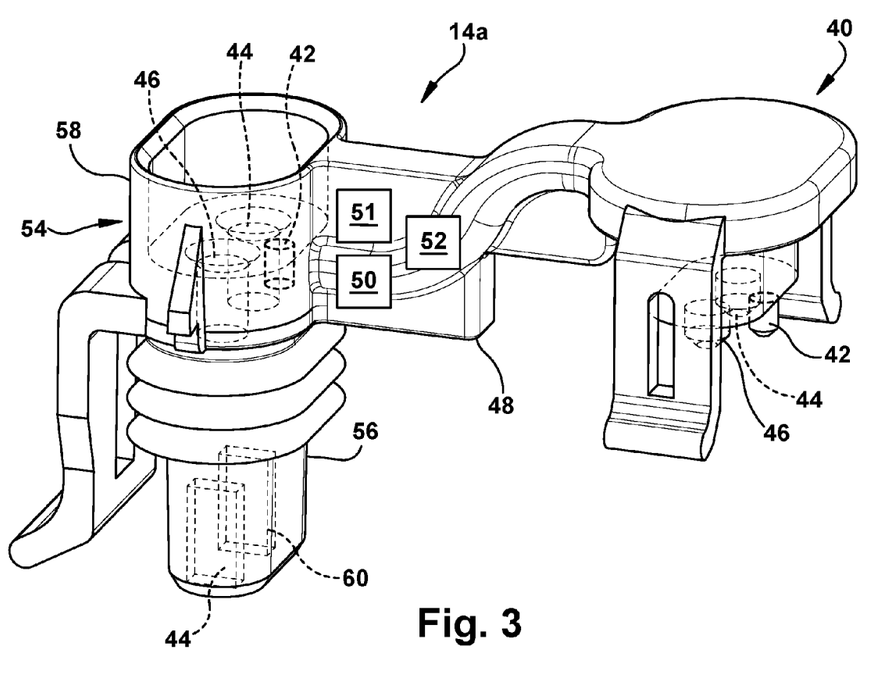
FIG. 3 illustrates a solenoid control device for use in the solenoid manifold, according to an example of this invention.

FIG. 3 illustrates an example of a solenoid control device, such as 14a. The solenoid control device 14a includes a first connector portion 40, configured to mate to a connector, such as the second connector 34 of the solenoid manifold 30 as in FIG. 2A. The second connector 34 is mated to the solenoid 16a prior the solenoid control device 14a being connected to the second connector 34. The first connector portion 40 includes a power input line 42, a ground line 44 and a communications line 46.

The solenoid control device 14a includes a jumper portion 48. Jumper portion 48 couples the first connector portion 40 with a second connector portion 54. The jumper portion 48 includes a driver circuit 50 and a processor 52. The driver circuit 50 may include a Field Effect Transistor (FET) or other means for driving a high current device in response to a control signal. The jumper portion 48 may also include a temperature sensor 51 and additional auxiliary inputs such as for solenoid delivery pressure, which are monitored by the jumper processor 52. The communications line 46, ground line 44 and power line 42 pass through the jumper portion 48 to the second connector portion 54.

The solenoid control device 14a second connector portion 54 receives the power line 42, ground line 44 and communications line 46 from the jumper portion 48 at a first end 58. The ground line 44 and voltage supply line 42 are configured to carry the current necessary to drive at least the solenoids 16a, 16b and other solenoids that may be connected to solenoid manifold 30. The first end 58 is configured to receive a second solenoid control device, such as 14b. A second end 56 of the second connector portion 54 is configured to connect to the second solenoid 16b. The second end 56 includes the ground line 44 and a control line 60 controlled by the driver circuit 50 and processor 52 of the solenoid control device 14a. If the solenoid manifold 30 includes only first solenoid 16a and second solenoid 16b, then the first end 58 may be capped with the electrical cover 36, as shown in FIG. 1, to prevent moisture and contaminants from entering the solenoid control device 14a.

The processor 52 includes a unique identifier for the solenoid control device 14a. The driver circuit 50 supplies power or removes power via the control line 60 to the associated solenoid connected to the second end 56 of the second connector portion 54 of the solenoid control device 14a in response to receiving a control message corresponding with the unique identifier. In general, the associated solenoid will promptly exhaust the air if is a normally open solenoid, apply the air if it is a normally closed solenoid or latch the air pressure to the accessory device in response to the control message.

Therefore, a solenoid control device comprises a first connector portion for mating to a first solenoid, the first connector portion comprising a power line, a communications line and a ground line. The solenoid control device comprises a jumper portion for coupling the first connector portion to a second connector portion; the jumper communicating with the power line, the ground line and the communications line and comprising a processor. The solenoid control device comprises a second connector portion for mating to a second solenoid, the second connector portion comprising a first end and a second end, the first end capable of receiving a second solenoid control device and communicating with the power line, the communications line and the ground line and the second end comprising a second control signal output and the ground line.

Figure 4:
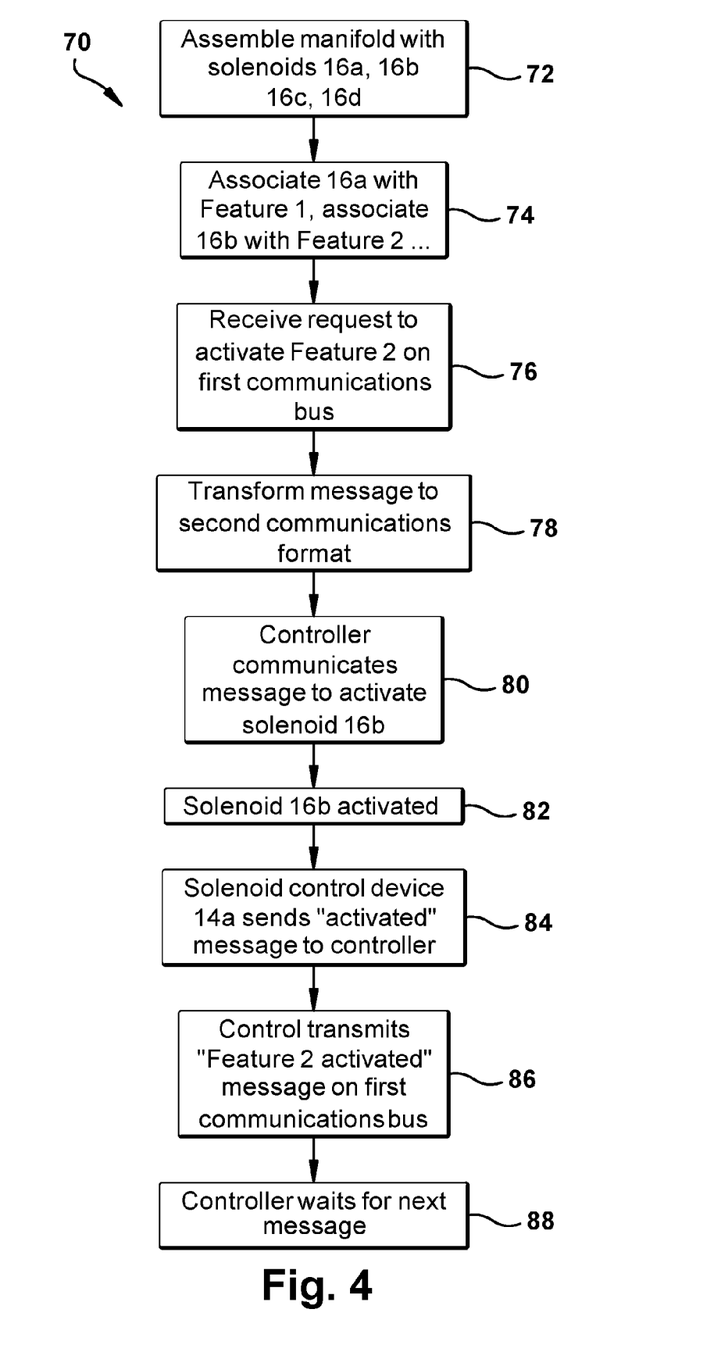
FIG. 4 illustrates a flow chart for a method of controlling the solenoid manifold according to an example of this invention.

FIG. 4 is a method 70 of programming and controlling the solenoid manifold 30 according to an example of the invention. In step 72, the solenoid manifold 30 is connected mechanically and electrically with four solenoids, such as solenoids 16a, 16b, 16c, 16d for example. The solenoids 16a, 16b, 16c, 16d are in pneumatic communication with the supply port 18 and the fasteners 37a, 37b, 37c may be used to ensure the solenoids 16a, 16b, 16c, 16d remain in alignment with one another. The electrical connection is made first with the second electrical connector 34 of the controller 12 and then the solenoid control devices 14a, 14b, 14c are added between each of the solenoids. If the controller 12 is integrated with the first solenoid 16a, then the electrical connection is made through the solenoid control devices 14a, 14b, 14c.

In step 74, the controller 12 of the solenoid manifold 30 associates vehicle features to each of the solenoids 16a, 16b, 16c, 16d. The association step may occur at the factory during the final assembly of the vehicle to which the solenoid manifold 30 will be assembled. For example, first solenoid 16*a* may be associated with a first feature, an air suspension exhaust, second solenoid 16*b* may be associated with a second feature, the interaxle lock, third solenoid 16*c* may be associated with a third feature, the differential lock and fourth solenoid 16*d* may be associated with a fourth feature, a power take off. All of the possible features that a solenoid manifold 30 may be capable of controlling may be in a look-up table in the processor of the controller 12. The association step may include assigning a serial number of each of the solenoid control devices 14*a*, 14*b*, 14*c* to the individual vehicle functions. The look-up table may be changed and configured as needed to accommodate custom or new functions for particular vehicle manufacturers.

In step 76, the controller 12 receives a first message via the vehicle communications bus to control a feature of the vehicle. For example, the message may request activation of the second feature, the interaxle lock. From step 74, the controller 12 knows that the interaxle lock feature is controlled by solenoid 16*b*, because solenoid 16*b* was associated with the interaxle lock feature in step 74.

In step 78, the controller 12 will then transform the request from the first communications format into a different format for the second communications bus. The second communications format may be a local communications bus using, for example, a LIN protocol, or a wireless communications means using, for example, a 433 MHz transmission. The second message may include the serial number of the solenoid control device 14*a*, 14*b*, 14*c*. The controller 12 transmits the second message on the second communications bus in step 80.

In step 82, the message is received by the first solenoid control device 14*a* connected to solenoid 16*b*. The first solenoid control device 14*a* activates the second solenoid 16*b* in accordance with the message request.

In step 84, the solenoid control device 14*a* transmits a message in the second communications bus format to confirm that the solenoid 16*b* is activated. In step 86, the controller 12 communicates a message on the first communications bus indicating that the second feature is activated.

In step 88, the controller 12 waits for another message on the first communications bus.

Additional solenoids can be added during the operating life of the solenoid manifold 30. Upon power up, the controller 12 can determine that there is a solenoid electrically connected to the solenoid manifold 30 that is not associated with a vehicle feature because the controller 12 receives messages from the new solenoid control device. The association step 74 will be repeated to properly associate the new solenoid with new feature. The association step 74 may be repeated during each power up cycle of the vehicle. Alternatively, the association step 74 may be initiated by the vehicle operator or vehicle manufacturer via an off board computer communicating with the controller 12 over the vehicle communications bus or other supported communication medium.

Diagnostics of each solenoid 16*a*, 16*b*, 16*c*, 16*d* is accomplished through communication between the solenoid control devices 14*a*, 14*b*, 14*c* and the controller 12. If a solenoid fails and needs to be replaced, no association step needs to be repeated, as long as the solenoid is paired with the exact same solenoid control device, such as solenoid control device 14*a* coupled to solenoid 16*b*. However, if a solenoid control device needs to be replaced along with the solenoid, or if the solenoid is repurposed for a different function on the vehicle, the association step 74 needs to be repeated to properly associate the new replacement solenoid with the feature previously associated with the now replaced solenoid.

Diagnostic messages may be transmitted by the controller 12 on the vehicle communications bus regarding the solenoid activity, the supply pressure values from pressure sensor 27, the temperature values from the temperature sensors 51, and/or any of the plurality of signals monitored by the controller 12 and the solenoid control devices, 14*a*, 14*b*, 14*c*. Once the diagnostic message is available on the vehicle communications bus, the diagnostic message can be used to alert the driver of an issue with the function supported by the solenoid manifold transmitting the diagnostic message. Additionally, the diagnostic messages can be structured with additional solenoid manifold information and transmitted via a telematics connection, if so configured. The diagnostic messages transmitted via telematics may enable a service center to prepare replacement parts for the vehicle prior to its arrival, decreasing the amount of vehicle down time for repair.

Therefore a method of controlling a plurality of solenoids comprises associating each solenoid of a plurality of solenoids with a single one of a plurality of vehicle functions in the controller, receiving a first message at the controller, the message including a request to enable one of the plurality of vehicle functions; and transmitting a second message from the controller to the plurality of solenoids to control the solenoid associated with the one of the plurality of vehicle functions.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method of controlling a plurality of solenoids comprising:
   electrically connecting a first solenoid to a controller;
   electrically connecting a second solenoid to the controller and the first solenoid via a first solenoid control device;
   programming a first function of the first solenoid at the controller;
   programming a second function of the second solenoid by means of the first solenoid control device;
   receiving a request to activate the second solenoid at the controller in a first format;
   translating the request to activate the second solenoid to a second format; and
   transmitting the request in the second format to activate the second solenoid to the second solenoid via the first solenoid control device.

2. The method as in claim 1, further comprising transmitting a diagnostic message from the first solenoid control device to the controller.

3. The method as in claim 1, further comprising programming a second function of the second solenoid via the controller and the solenoid control device.

4. The method as in claim 1, further comprising electrically connecting a third solenoid to a controller via a second solenoid control device and the first solenoid control device;

wherein the first solenoid and the second solenoid activate in response to different control messages.

5. The method as in claim 1, further comprising measuring the pneumatic supply pressure.

\* \* \* \* \*